US009441798B2

(12) United States Patent
Chen et al.

(10) Patent No.: US 9,441,798 B2
(45) Date of Patent: Sep. 13, 2016

(54) LIGHT SOURCE UNIT, A LIGHT ENGINE HAVING THE LIGHT SOURCE UNIT AND AN ILLUMINATING APPARATUS

(75) Inventors: WeiHuang Chen, Shenzhen (CN); Al Ma, Foshan (CN); SiXiong Zeng, Shenzhen (CN); Haiqiang Zhong, Shenzhen (CN)

(73) Assignee: OSRAM GMBH, Munich (DE)

( * ) Notice: Subject to any disclaimer, the term of this patent is extended or adjusted under 35 U.S.C. 154(b) by 171 days.

(21) Appl. No.: 14/232,630

(22) PCT Filed: Jun. 5, 2012

(86) PCT No.: PCT/EP2012/060594
§ 371 (c)(1),
(2), (4) Date: Mar. 13, 2014

(87) PCT Pub. No.: WO2013/010718
PCT Pub. Date: Jan. 24, 2013

(65) Prior Publication Data

US 2014/0218916 A1 Aug. 7, 2014

(30) Foreign Application Priority Data

Jul. 15, 2011 (CN) .......................... 2011 1 0199690

(51) Int. Cl.
*F21V 5/00* (2015.01)
*F21K 99/00* (2016.01)
*F21V 7/00* (2006.01)

(Continued)

(52) U.S. Cl.
CPC . *F21K 9/50* (2013.01); *F21V 5/00* (2013.01); *F21V 5/007* (2013.01); *F21V 7/00* (2013.01); *F21V 7/0083* (2013.01); *F21V 13/04* (2013.01);

(Continued)

(58) Field of Classification Search
CPC .......... F21V 5/007; F21V 13/04; F21V 7/00; F21V 14/04; F21V 14/06; F21V 13/045; F21V 7/0083; F21V 5/00; F21V 7/0025; F21V 7/048; F21V 7/10; F21K 9/50; F21W 2131/202; F21Y 2101/02; F21Y 2105/001
See application file for complete search history.

(56) References Cited

U.S. PATENT DOCUMENTS 4,037,096 A 7/1977 Brendgord et al.
4,400,765 A 8/1983 Kochem (Continued)

FOREIGN PATENT DOCUMENTS

CN 101688654 A 3/2010
EP 1496488 A1 1/2005

(Continued)

OTHER PUBLICATIONS

International Search Report issued in the corresponding PCT Application No. PCT/EP2012/060594, dated Sep. 25, 2012, 10 pages.

(Continued)

*Primary Examiner* — Bao Q Truong
(74) *Attorney, Agent, or Firm* — Viering, Jentschura & Partner mbB

(57) ABSTRACT

A light source unit of a light engine is disclosed, wherein the light source unit includes a plurality of LED sub light source units each comprising at least one LED and an optical device corresponding to the at least one LED, the optical device is configured to modify a beam from each LED to be an approximately collimated beam.

19 Claims, 8 Drawing Sheets

(51) Int. Cl.

| | |
|---|---|
| ***F21V 13/04*** | (2006.01) |
| *F21W 131/202* | (2006.01) |
| *F21Y 101/02* | (2006.01) |
| *F21Y 105/00* | (2016.01) |

(52) U.S. Cl.

CPC ..... *F21W 2131/202* (2013.01); *F21Y 2101/02* (2013.01); *F21Y 2105/001* (2013.01)

(56) References Cited

U.S. PATENT DOCUMENTS 5,580,156 A * 12/1996 Suzuki ..................... B60Q 7/00 116/63 P
2005/0195599 A1* 9/2005 Marka ..................... F21S 2/005 362/232
2010/0014286 A1* 1/2010 Yoneda ..................... F21V 5/00 362/231
2010/0039819 A1* 2/2010 Fournier ................. F21V 14/06 362/268
2010/0271818 A1 10/2010 Smith
2011/0068708 A1 3/2011 Coplin et al.
2011/0228534 A1* 9/2011 Zhang ..................... F21S 6/002 362/240
2013/0088850 A1* 4/2013 Kroell ...................... G02B 5/09 362/84

FOREIGN PATENT DOCUMENTS

EP 1847762 A2 10/2007
WO 2004031649 A1 4/2004
WO 2008137109 A1 3/2010

OTHER PUBLICATIONS

Chinese Office Action based on Application No. 2011101996904(7 Pages and 7 Pages of English translation) dated Apr. 1, 2015 (Reference Purpose Only).

* cited by examiner

LIGHT SOURCE UNIT, A LIGHT ENGINE HAVING THE LIGHT SOURCE UNIT AND AN ILLUMINATING APPARATUS

RELATED APPLICATIONS

The present application is a national stage entry according to 35 U.S.C. §371 of PCT application No.: PCT/EP2012/060594 filed on Jun. 5, 2012, which claims priority from Chinese application No. 201110199690.4 filed on Jul. 15, 2011, and is incorporated herein by reference in its entirety.

TECHNICAL FIELD

Various embodiments relate to a light source unit of a light engine, particularly a light engine for medical application, a light engine having the light source unit and an illuminating apparatus.

BACKGROUND

At present, the LED products are widely used in daily life. The LED (light emitting diode) has been gradually replacing the traditional halogen lamp as it has the advantages such as stable property, easy manufacturing and low power consumption. However, in a situation where a high light brightness and efficiency are required, e.g. in surgery, an illuminating apparatus quite matched with the application field is demanded for obtaining the effect of a lamp with uniform and shadowless illumination. Thus, a halogen bulb is still used currently. In view of the disadvantages such as high power consumption of the halogen bulb, the customer desires to obtain a solution capable of replacing the halogen bulb with the LED.

SUMMARY

The present disclosure relate to a light source unit of a light engine in a medical. The light source unit according to the present disclosure can provide a collimated beam to be zoomed, and realize effect of a shadowless lamp upon zoom.

Various embodiments provide a light source unit of a light engine. The light source unit includes a plurality of LED sub light source units each including at least one LED and an optical device corresponding to the at least one LED. The optical device is configured to modify a beam from an LED to be an approximately collimated beam. The light source unit composed of the LED sub light source units not only has the characteristics of a low cost and strong stability but also has the advantage of a small volume compared with the traditional halogen bulb. Therefore, a higher brightness can be obtained in the same space. The optical device configured to change beams from the respective LED sub light source units may correspond to one or more LEDs, for instance, the LED may be mounted in such optical device in a one-to-one relationship or many-one relationship with the optical device.

The LED light sources can be of any color or white, for medical applications preferably of white color with a certain color temperature, for example between 2800 K and 8000 K, and a certain color rendering index (color rendition). However, this invention is not limited to white light applications.

According to a preferred solution in the present disclosure, the optical device includes at least one lens accommodating the LED therein and at least one primary reflector provided to surround each lens. The optical device constructed in such a manner also can realize an effect of collimating a beam from an LED light source.

According to a preferred solution in the present disclosure, each LED sub light source unit includes one LED, one lens and one primary reflector. Thus, it can assure the beam from the LED light source can be emitted after collimation in a situation of a simplest construction.

Preferably, each LED sub light source unit is in a honeycomb arrangement, thus further assuring the compactness of the whole light engine structure and further improving the output light efficiency.

According to a preferred solution in the present disclosure, each lens is in an approximately cylinder shape. The cylinder-shaped lens may enclose the LED therein so as to change the direction of the beam emitted from the LED light source unit while mechanically protecting the LED.

Preferably, each lens is a total internal reflection lens, thus advantageously improving the light efficiency.

Preferably, the light engine includes at least one, preferably a plurality of lens boards each provided with a part of lenses among all the lenses. Different numbers of the lens boards may be combined according to practical usage requirements so as to obtain light source units suited to respective application purposes.

In a preferred solution in the present disclosure, a cross section of each primary reflector is in a hexagonal shape constructed by six reflecting portions each forming an edge of the hexagonal shape. A compact arrangement is accomplished upon a combination of geometry and optics.

Preferably, each lens is located in a corresponding primary reflector in a hexagonal shape. Particularly preferably, each lens is located in a center of the corresponding primary reflector in a hexagonal shape. Using the primary reflector in a hexagonal shape to enclose the lens located therein, especially in the center, can assure the same reflection to all emergent beams from the light source after passing through the lens, and moreover, it is further favorable for the compact arrangement.

According to a preferred solution in the present disclosure, respective primary reflectors with a cross section in a hexagonal shape are connected with each other to form a honeycomb layout. A compact and stable structure may be realized via the honeycomb layout. Thereby, a space occupied by the primary reflectors is minimized while assuring the brightness of the light engine unchanged.

According to a preferred solution in the present disclosure, the light source unit further includes at least one, preferably a plurality of primary reflector boards each distributed with a part of the primary reflectors among all the primary reflectors. Since the light engine includes at least one lens board, such configuration may enable the lens on each lens board and the primary reflector on each primary reflector board preferably to correspond to each other.

According to a preferred solution in the present disclosure, each primary reflector board may be mounted on each corresponding lens board so as to accommodate respective lens in respective primary reflector to form an LED light source module that can be assembled with each other. In addition, the respective primary reflector board and the respective lens board are mounted together, which is favorable to updating or replacing any one part thereof.

According to a preferred solution in the present disclosure, there are six LED light source modules, respective primary reflector boards are combined with each other to form a light source unit in an approximately hexagonal shape. The six LED light source modules are connected together in turn via edges of six primary reflector boards to form the light source unit in a hexagonal shape, which is favorable for obtaining a uniform light distribution.

Preferably, the respective LED sub light source units jointly form a surface light source substantially in the same plane so as to realize uniform illumination of the surface light source with a high light intensity.

Another object of the present disclosure lies in providing a light engine, including the light source unit above. The same light distribution can be obtained by replacing a traditional halogen lamp with the light engine according to the present disclosure to be mounted in an illuminating apparatus; moreover, the energy consumption of the illuminating apparatus can be advantageously saved.

According to a preferred embodiment in the present disclosure, the light engine further includes a zoom unit that receives a collimated input beam from a light source unit and provides an output beam after changing a shape of the beam. Light distributions suited to various conditions may be obtained with such zoom unit.

According to a preferred embodiment in the present disclosure, a distance between the light source unit and the zoom unit is adjustable. A light path of a beam emitted from the light engine is changed according to the distance between the light source unit and the zoom unit, thereby a focusing area may be changed and application fields of the light engine according to the present disclosure are expanded.

According to a preferred embodiment in the present disclosure, the zoom unit includes at least one lens, at least one first reflector and at least one second reflector, the at least one lens receiving a collimated beam from the light source unit of the light engine, the collimated beam is incident on the first reflector after being converged by the lens, and is incident on the second reflector after being reflected by the first reflector, to produce an output beam with its beam angle changed. Through such special structure of the zoom unit, the beam emitted from the light source unit can be mixed sufficiently with the smallest light loss and the direction of the beam can be changed adaptively, thereby assuring the emergent beam similar to that of a halogen lamp also may be obtained without change of an outer cover of traditional illuminating apparatus.

According to a preferred solution in the present disclosure, the lens is a donut lens, i.e donut-like lenses (i.e. circular, symmetrical, with a hole in the middle; in the following called: donut-lenses). To provide the lens to be donut or to provide the lens to have a plurality of lens portions in a symmetrical arrangement and donut distribution can uniformly converge an incident beam from the light source to a greatest degree and avoid the light loss.

According to a preferred solution in the present disclosure, the first reflector is faceted disk reflector arranged in the same row with and behind the lens. A plurality of first reflectors reflect the beams converged by the lenses towards the second reflector located in a center, for improving the light efficiency and assuring the desired primary reflected beams.

According to an improved solution in the present disclosure, the second reflector is a reflector in a horn shape. Respective reflecting surfaces of the second reflector in a horn shape are oriented to the first reflector, and the primary reflected beams, upon reaching the reflecting surfaces of the second reflector, are secondly reflected to form the output beam.

And still another object of the present disclosure lies in providing a illuminating apparatus in a medical including a light engine having the above features and a reflecting cover configured to mount the light engine, the reflecting cover enclosing the light engine for forming light output from the light engine into a convergent column light after being reflected by the reflecting cover. Compared with the traditional illuminating apparatus, such illuminating apparatus has the same outer shape and also can realize the same shadowless illumination; moreover, it has all merits of the LED illuminating apparatus, such as a low cost and a high light efficiency, since it uses the LED as the light source.

According to a preferred solution in the present disclosure, the reflecting cover and the zoom unit of the light engine are correspondingly provided. The approximately straight beam emitted from the light engine may be reflected on an inner wall of the reflecting cover, and may preferably render the effect similar to that of a shadowless lamp or other expected illuminating effects upon corresponding modifications.

It should be understood that the general descriptions above and the detailed descriptions below are illustrative for the purpose of further explaining the required present disclosure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
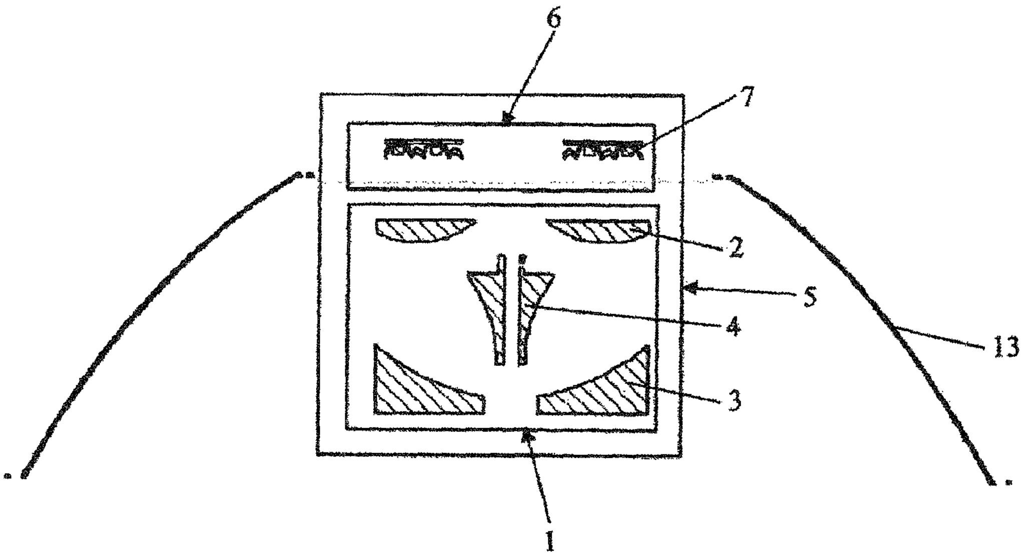
FIG. 1 is a sectional top view of an illuminating apparatus according to the present disclosure.

FIG. 1 is a sectional top view of an illuminating apparatus according to the present disclosure. The illuminating apparatus according to the present disclosure has a light engine 5 and a reflecting cover 13 configured to mount and enclose the light engine 5, wherein the light engine 5 includes an LED light source unit 6 and a zoom unit 7 behind the LED light source unit 6. The LED light source unit 6 and the zoom unit 1 may be housed separately or jointly.

The reflecting cover 13 is the same as the reflecting cover 13 of an illuminating apparatus using a halogen light source in the prior art. The difference is replacing a halogen lamp light source with the LED light source unit 6 and the zoom unit 1, to provide an LED light and zoom beam, realizing illumination with a high light efficiency and a high brightness in a compact space. LED light source unit 6 and zoom unit 1 are firstly provided by the inventor and the two units can cooperated with each other or independent from each other, such as the zoom unit 1 may cooperate with other light source unit.

A beam emitted from the LED light source unit 6 is transformed into an output beam L4 after light mixing and angle modification by the zoom unit 1 (see FIG. 5 and FIGS. 6A-6C). According to one aspect of the present disclosure, light engine including LED source unit is used to replace the traditional halogen lamp, on the other aspect, the zoom unit provided by present disclosure is used to mix the beam emitted from the light source sufficiently with smallest light loss, while at the same time, the outer profile of the reflecting cover 13 of the illuminating apparatus according to the present disclosure does not need to be changed. Thereby, the object of widely applying the light engine with the LED in various fields can be achieved, and especially in a situation that light efficiency and light intensity are particularly required, such as in the field of surgery, the illuminating apparatus according to the present disclosure can be used as a lamp producing uniform and shadowless illumination.

Next, the LED light source unit 6 and the zoom unit 1 provided by present disclosure may be described more detailed, respectively.

It is shown in FIG. 1 that the zoom unit 1 receives collimated beams from the LED light source units 6 and modifies these beams. The zoom unit 1 includes a lens 2, a first reflector 3 and a second reflector 4. Lens 2, first reflector 3 and a second reflector 4 may be one or more. What is important is that the lens 2, or the first reflector 3 or the second reflector 4 is configured to be rotationally symmetric, or a plurality of lenses 2, or a plurality of first reflectors 3 or a plurality of second reflectors 4 are distributed in a manner of rotationally symmetric to each other so as to realize a final good converging effect of the beams. In the present embodiment, the lens 2 preferably is configured as a donut lens 2 rotationally symmetric for receiving a collimated beam LI from the LED light source unit 6 (see FIG. 5 and FIGS. 6A-6C) so as to converge the collimated beam LI to a greatest degree and avoid the light loss. The first reflector 3 preferably is configured as a faceted disk reflector arranged corresponding to the lens 2 and reflects a beam converged by the lens 2 to a reflecting surface of the second reflector 4 through a reflecting surface towards the lens 2 and the second reflector 4. The second reflector 4 preferably is configured to be in a horn shape, wherein one end of the second reflector 4 towards the first reflector 3 is a small diameter end, and the other end towards the LED light source unit 6, i.e. towards the lens 2, is a big diameter end. The second reflector 4 is located in a center of the zoom unit 1, deviated from a light path from the lens 2 to the first reflector 3, and surrounded by the lens 2 and the first reflector 3 symmetrically. The second reflector 4 provides a zoom beam with a small light loss to the reflecting cover 13 rotationally and symmetrically arranged so as to make the beam produce a good converging effect upon a final reflection by the reflecting cover.

Figure 2:
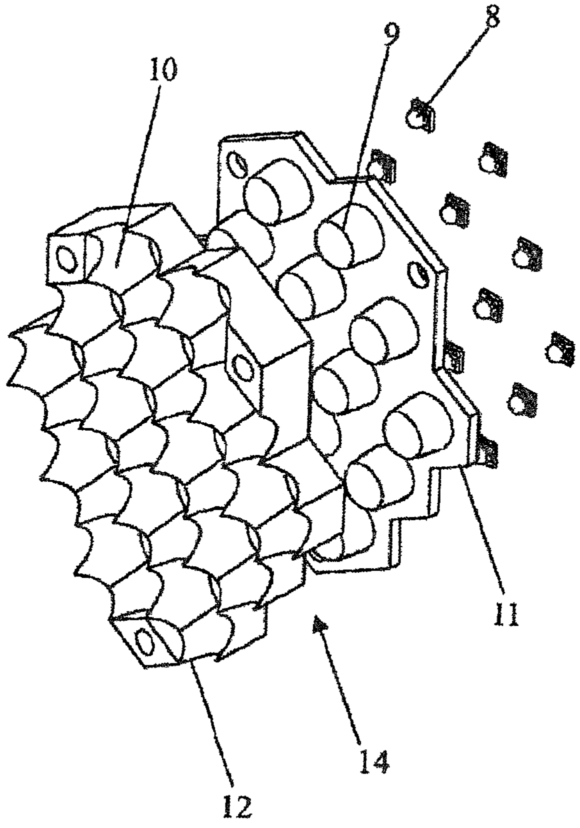
FIG. 2 is an exploded perspective view of a single LED Light source module of a light source unit according to the present disclosure, in which the LED Light source module has a plurality of LED sub light source units.
Figure 3:
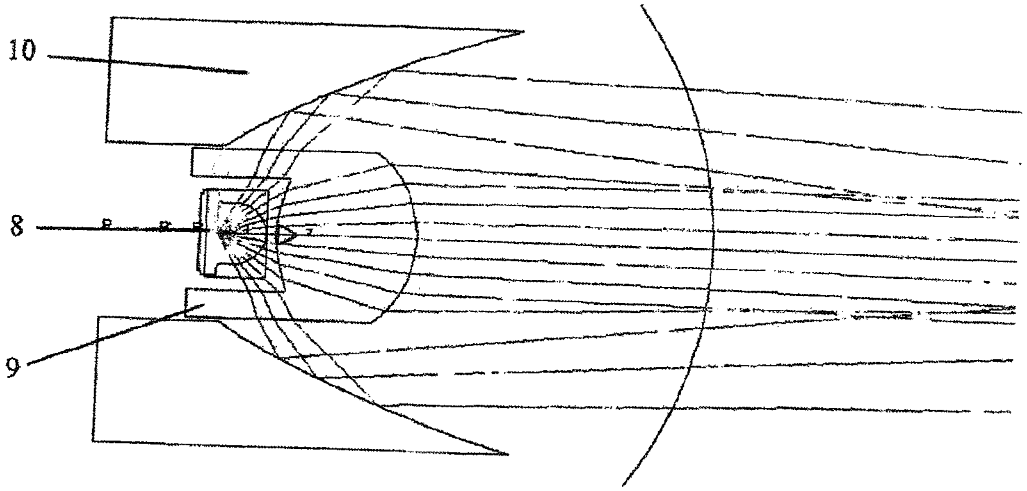
FIG. 3 is a sectional view of a LED sub light source unit.

FIG. 2 is an exploded perspective view of a single LED Light source module of an LED light source unit according to the present disclosure, in which the LED Light source module has a plurality of LED sub light source units. It can be seen from FIG. 2 that the LED light source unit 6 includes a plurality of LED sub light source units 7 each including at least one LED 8 and an optical device configured to modify beams from respective LEDs to appropriately collimated beams. In the present embodiment, the optical device includes a lens 9 and at least one primary reflector 10 arranged at an outer periphery of each lens 9 (see FIG. 3).

Preferably, one LED 8 corresponds to one lens 9 and one primary reflector 10. At least one, preferably a plurality of lens boards 11 and at least one, preferably a plurality of primary reflector boards 12 are provided, each lens board 11 is provided with a plurality of lenses 9 in a cylinder shape, and each primary reflector board 12 is provided with the primary reflector 10 in a number corresponding to that of the lens on each lens board 11. Each lens board 11, primary reflector board 12 and LED 8 are independent parts, so as to be simply combined for use to form a LED light source unit 6 from LED light source modules 14. Moreover, corresponding parts may be changed respectively if the illuminating apparatus is failed or to be updated, so that the maintenance cost is reduced and the assembling process is simplified. A plurality of LED light source modules 14 may be assembled to obtain different kinds of brightness so that the LED light source modules 14 is additionally provided or dismantled according to usage requirements.

In a preferred embodiment, the lens 9 is a total internal reflection lens; thereby the light efficiency of the whole illuminating apparatus may be improved. The lens 9 herein is configured to be in a cylinder shape, which not only uses its inherent optical characteristics but also takes it as a protecting cover to accommodate one or more LEDs 8 therein, satisfying the requirement of protecting an LED chip. (see FIG. 3) A cross section of the primary reflector 10 for accommodating the lens 2 is configured to be in a hexagonal shape constructed by six reflecting portions each forming an edge of the hexagonal shape. Preferably, a side wall of each primary reflector 10 meanwhile is configured to restrict another adjacent primary reflector 10, thus, the respective primary reflectors 10 are connected with each other to form a honeycomb layout. The lens 2 is located in a corresponding primary reflector 10, and preferably, in a center thereof, to render a compact layout and uniform beam.

Figure 4:
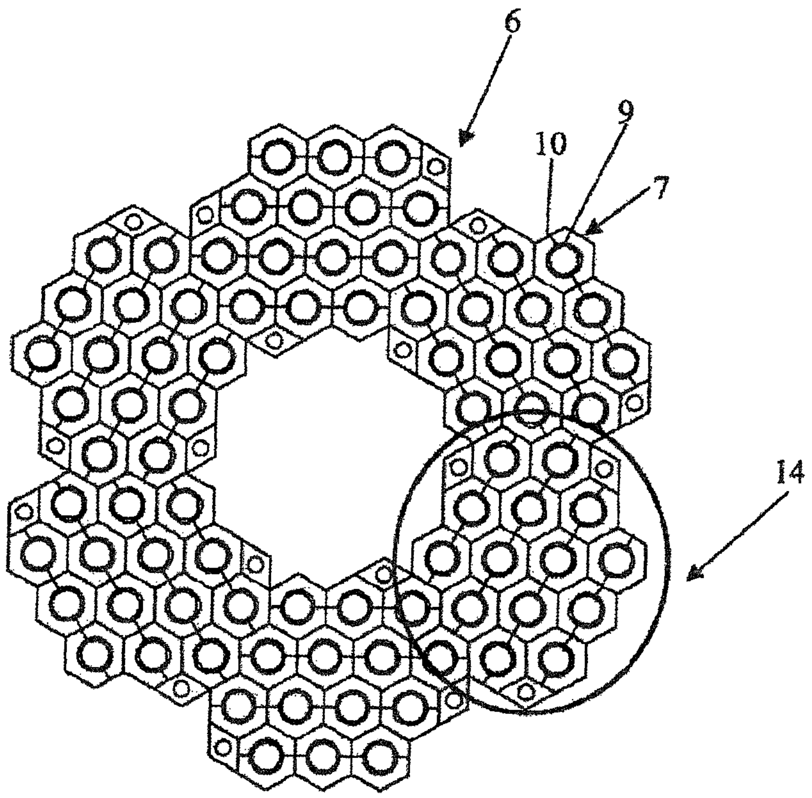
FIG. 4 is a sectional view of a light source unit of a light engine according to the present disclosure.

FIG. 4 is a sectional view of a light source unit according to the present disclosure. A honeycomb LED light source unit 6 is formed by six LED light source modules connected with each other, wherein each LED light source module 14 is composed of one lens board 11 with a plurality of lens, one primary reflector board 12 with a plurality of primary reflectors and a plurality of LEDs 8. Upon an optimized solution, the arrangement above may realize a compact arrangement of the light source unit in a condition of a fixed structure dimension, thereby obtaining a higher light efficiency. And a relatively uniform emergent beam also may be obtained based on the symmetric property of the honeycomb structure.

Figure 5:
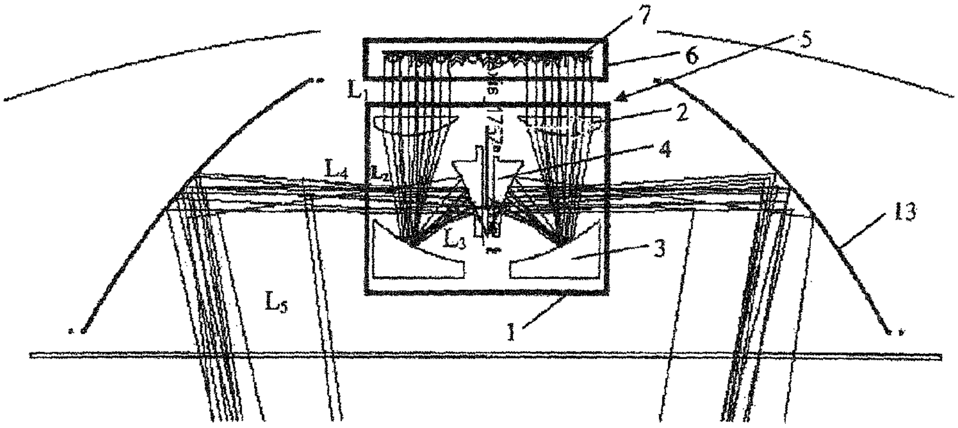
FIG. 5 is a light path diagram of an illuminating apparatus according to the present invention.
Figure 6A:
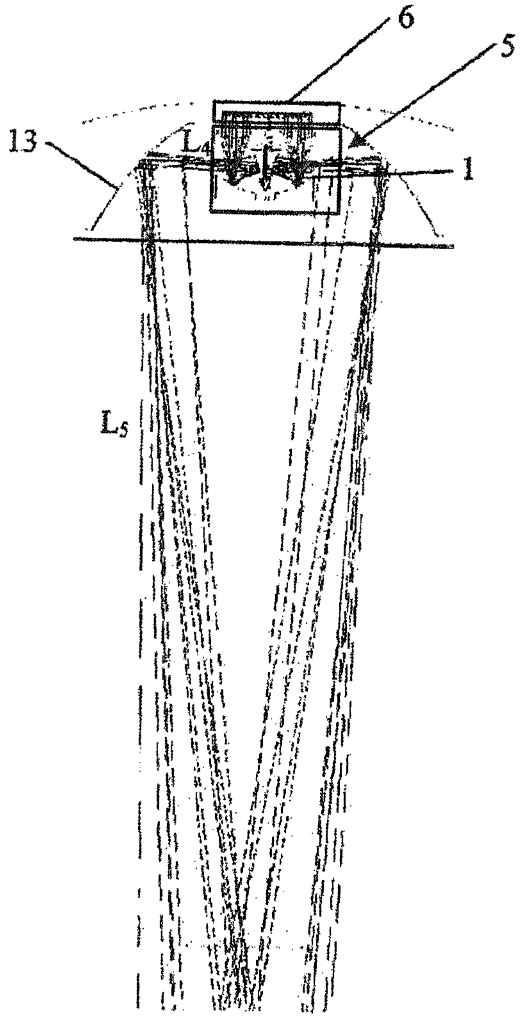
FIGS. 6A-6C are light path diagrams in three different embodiments of an illuminating apparatus according to the present disclosure.
Figure 6B:
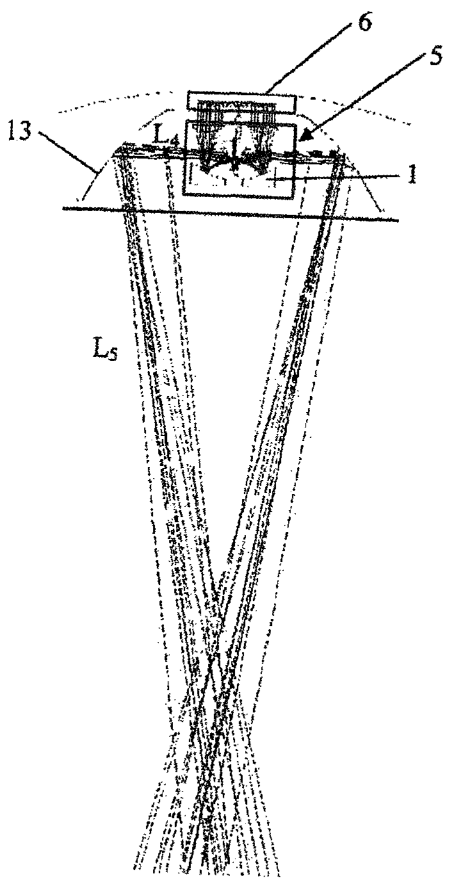
Figure 6C:
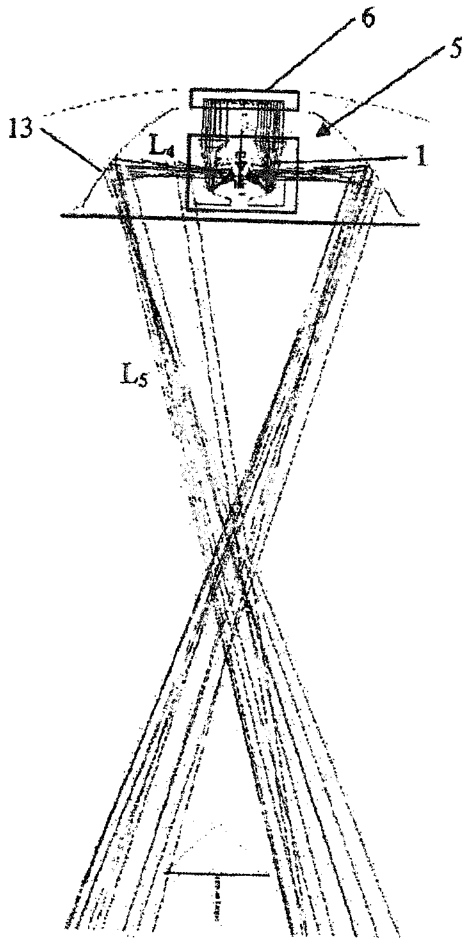

FIG. 5 is a light path diagram of an illuminating apparatus according to the present disclosure. It can seen clearly therefrom that a beam emitted from the LED 8, upon modification by corresponding optical devices, i.e. the lens 9 in a cylinder shape and the primary reflector 10 with a cross section in a hexagonalshape, is incident in the lens 2 in the zoom unit 1 in a form of approximately collimated beam LI. The collimated beam LI, after converged by the lens 2, is formed into a convergent beam L2 that is incident in concentration to a reflecting surface of the first reflector 3. As the reflecting surface of the first reflector 3 is also oriented to the second reflector 4 in the center of the zoom unit 1, a beam L3 reflected by this reflecting surface therefore is incident uniformly to the second reflector 4 in a horn shape. The second reflector 4 gradually gets thicker from one end close to the first reflector 3 to one end close to the lens 2. The beam L3, after reflected by the second reflector herein, forms an output beam L4. The approximately straight beam L4 emitted from the light engine 5 may be reflected on the inner wall of the reflecting cover 13, which can preferably obtain the effect with different focusing areas similar to that of the shadowless lamp or other expected illuminating effect, by correspondingly modifying relative positions of the LED light source unit 6 and the zoom unit 1, and modifying an orientation of an reflecting surface of each reflector of the zoom unit 1 and an orientation of the reflecting cover 13, FIGS. 6A-6C are light path diagrams in three different embodiments of an illuminating apparatus according to the present disclosure. In FIG. 6A, a distance between the light source unit 6 and the zoom unit 1 is quite small; thereby an emergent beam L5 with a far focus is obtained. In FIG. 6B, a distance between the light source unit 6 and the zoom unit 1 becomes bigger than that in FIG. 6A, thereby an emergent beam L5 with a relatively close focus is obtained. And in FIG. 6C, a distance between the light source unit 6 and the zoom unit 1 is the biggest; thereby an emergent beam L5 with the closest focus is obtained. Of course, the illuminating apparatus according to the present disclosure may be further modified according to specific requirements in practical application to obtain a desired light distribution and satisfactory light efficiency.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS

1 zoom unit
2 lens of zoom unit
3 first reflector
4 second reflector
5 light engine
6 light source unit
7 LED sub light source unit
8 LED
9 lens of light source unit
10 primary reflector
11 lens board
12 primary reflector board
13 reflecting cover
14 LED light source module
L1-L5 beam

The invention claimed is:

1. A light source unit of a light engine, wherein the light source unit comprises a plurality of LED sub light source units each comprising at least one LED and an optical device corresponding to the at least one LED, the optical device is configured to modify a beam from each LED to be an approximately collimated beam, wherein the optical device includes at least one lens accommodating the LED therein and at least one primary reflector provided to surround each lens, further comprising at least one lens board each provided with a part of lenses among all the lenses, wherein a cross section of each primary reflector is in a hexagonal shape constructed by six reflecting portions each forming an edge of the hexagonal shape.

2. The light source unit according to claim 1, wherein each LED sub light source unit comprises one LED, one lens and one primary reflector.

3. The light source unit according to claim 1, wherein each lens is in an approximately cylinder shape.

4. The light source unit according to claim 1, wherein each lens is a total internal reflection lens.

5. The light source unit according to claim 1, wherein each lens is located in a corresponding primary reflector in a hexagonal shape.

6. The light source unit according to claim 5, wherein each lens is located in a center of the corresponding primary reflector in a hexagonal shape.

7. The light source unit according to claim 1, wherein respective primary reflectors with a cross section in a hexagonal shape are connected with each other to form a honeycomb layout.

8. The light source unit according to claim 7, further comprising at least one primary reflector board each distributed with a part of the primary reflectors among all the primary reflectors.

9. The light source unit according to claim 8, wherein each set of primary reflector boards may be mounted on each set of corresponding lens boards so as to accommodate respective lens in respective primary reflector to form an LED light source module that can be assembled with each other.

10. The light source unit according to claim 9, wherein the light source unit is formed by six LED light source modules combined with each other into an approximately hexagonal shape.

11. The light source unit according to claim 2, wherein each LED sub light source unit is in a honeycomb arrangement.

12. The light source unit according to claim 2, wherein the respective LED sub light source units jointly form a surface light source substantially in the same plane.

13. A light engine, comprising a light source unit, wherein the light source unit comprises a plurality of LED sub light source units each comprising at least one LED and an optical device corresponding to the at least one LED, the optical device is configured to modify a beam from each LED to be an approximately collimated beam, wherein the light engine further comprises a zoom unit that receives a collimated input beam from the light source unit and provides an output beam after changing a shape of the beam, wherein the zoon unit comprises at least one lens, at least one first reflector and at least one second reflector, the at least one lens receiving a collimated beam from the light source unit of the light engine the collimated beam being incident on the first reflector after being converged by the lens, and being incident on the second reflector after being reflected by the first reflector, to produce an output beam with its light output angle changed.

14. The light engine according to claim 13, wherein a distance between the light source unit and the zoom unit is adjusted according to different required focusing areas.

15. The light engine according to claim 14, wherein a lens is a donut lens provided to be rotationally symmetric.

16. The light engine according to claim 13, wherein the first reflector is faceted disk reflector arranged in a same row with and behind the lens.

17. The light engine according to claim 13, wherein the second reflector is a reflector in a horn shape.

18. The light engine according to claim 17, wherein the second reflector is provided to be offset from a light path between the lens and the first reflector and is located on a rotationally symmetric axis of the lens.

19. The light engine according to claim 17, wherein the second reflector is provided with a small diameter end thereof close to the first reflector and a big diameter end thereof close to the lens.

* * * * *